United States Patent
Chu et al.

(10) Patent No.: US 10,416,835 B2
(45) Date of Patent: Sep. 17, 2019

(54) THREE-DIMENSIONAL USER INTERFACE FOR HEAD-MOUNTABLE DISPLAY

(71) Applicant: Samsung Electronics Co., Ltd., Suwon-si, Gyeonggi-do (KR)

(72) Inventors: Alexander Chu, Plano, TX (US); Sophie Kim, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 14/746,388

(22) Filed: Jun. 22, 2015

(65) Prior Publication Data
US 2016/0370970 A1   Dec. 22, 2016

(51) Int. Cl.
*G06F 3/0481* (2013.01)
*G06F 3/01* (2006.01)

(52) U.S. Cl.
CPC .......... *G06F 3/04815* (2013.01); *G06F 3/011* (2013.01)

(58) Field of Classification Search
CPC ............................. G06F 3/04815; G06F 3/011
USPC ......................................................... 715/836
See application file for complete search history.

(56) References Cited

U.S. PATENT DOCUMENTS

| 8,643,951 | B1* | 2/2014 | Wheeler | G06F 3/012 |
| | | | | 359/630 |
| 2008/0161997 | A1 | 7/2008 | Wengelnik et al. | |
| 2010/0208033 | A1* | 8/2010 | Edge | G06F 3/012 |
| | | | | 348/46 |
| 2012/0151416 | A1* | 6/2012 | Bell | G02B 27/2228 |
| | | | | 715/848 |
| 2013/0106674 | A1 | 5/2013 | Wheeler et al. | |
| 2013/0246967 | A1* | 9/2013 | Wheeler | G06F 3/012 |
| | | | | 715/784 |
| 2014/0218472 | A1 | 8/2014 | Kim et al. | |

(Continued)

FOREIGN PATENT DOCUMENTS

WO   2014107629 A1   7/2014
WO   2015046669 A1   4/2015

OTHER PUBLICATIONS

International Search Report dated Aug. 24, 2016 in connection with International Application No. PCT/KR2016/005629, 3 pages.

(Continued)

*Primary Examiner* — John T Repsher, III

(57) ABSTRACT

A method, apparatus, and computer-readable medium for a user interface (UI) for a head-mountable display (HMD). The method includes generating three-dimensional content for display by the HMD. The method also includes identifying three-dimensional coordinates for UI elements of the UI that are associated with the three-dimensional content. The three-dimensional coordinates identified within an angular range for the UI that includes a viewable region of a user while wearing the HMD. Additionally, the method includes, in response to a user input, displaying the UI elements at the identified three-dimensional coordinates over the three-dimensional content. The method may further include, after displaying the UI elements, moving the display of the UI elements on the HMD in a direction corresponding to a movement direction of the HMD in response to detecting movement of the HMD corresponding to movement of a head of the user wearing the HMD.

15 Claims, 6 Drawing Sheets

(56) References Cited

U.S. PATENT DOCUMENTS

| | | | |
|---|---|---|---|
| 2014/0225814 A1 | 8/2014 | English et al. | |
| 2014/0333666 A1* | 11/2014 | Poulos | G06T 19/006 |
| | | | 345/633 |
| 2015/0153571 A1* | 6/2015 | Ballard | G02B 27/017 |
| | | | 345/8 |
| 2015/0169070 A1 | 6/2015 | Harp et al. | |
| 2015/0186397 A1* | 7/2015 | Cueto | G06F 17/30126 |
| | | | 715/854 |
| 2015/0235426 A1* | 8/2015 | Lyons | G02B 27/0172 |
| | | | 345/8 |
| 2016/0027215 A1* | 1/2016 | Burns | G02B 27/0172 |
| | | | 345/419 |
| 2016/0217614 A1* | 7/2016 | Kraver | G06T 19/006 |

OTHER PUBLICATIONS

Written Opinion of the International Searching Authority dated Aug. 24, 2016 in connection with International Application No. PCT/KR2016/005629, 6 pages.

European Patent Office, "European Search Report," Application No. 16167554.1-1553, dated Nov. 18, 2016, 6 pages, publisher EPO, Munich, Germany, place of search The Hague.

First Office Action regarding Chinese Patent Application No. 201610423816.4, dated Mar. 4, 2019, 22 pages.

* cited by examiner

— Status Bar
— Action Bar

— Content Area

— Navigation Bar

THREE-DIMENSIONAL USER INTERFACE FOR HEAD-MOUNTABLE DISPLAY

TECHNICAL FIELD

This disclosure relates generally to head-mountable displays (HMDs). More specifically, this disclosure relates to a three-dimensional (3D) user interface (UI) for a HMD.

BACKGROUND

Although HMD technology has long been in development and wearable technology such as Google Glass and Vuzix® products are increasingly visible, there is a lack of specialized UI framework for HMD for both virtual reality (VR) and augmented reality (AR) applications. Current HMD technology focuses on the implementation and treatment of the main content display, and the attention to the UI has been minimal.

SUMMARY

Embodiments of the present disclosure provide a 3D UI for a HMD.

In one embodiment, a method for displaying a UI for a HMD is provided. The method includes generating three-dimensional content for display by the HMD. The method also includes identifying three-dimensional coordinates for UI elements of the UI that are associated with the three-dimensional content. The three-dimensional coordinates identified within an angular range for the UI that includes a viewable region of a user while wearing the HMD. Additionally, the method includes, in response to a user input, displaying the UI elements at the identified three-dimensional coordinates over the three-dimensional content.

In another example embodiment, an apparatus for displaying a UI is provided. The apparatus includes a HMD and at least one processor. The at least one processor is configured to generate three-dimensional content for display by the HMD and identify three-dimensional coordinates for UI elements of the UI that are associated with the three-dimensional content. The three-dimensional coordinates are identified within an angular range for the UI that includes a viewable region of a user while wearing the HMD. Additionally, the at least one processor is configured to, in response to a user input, cause the HMD to display the UI elements at the identified three-dimensional coordinates over the three-dimensional content.

In yet another example embodiment, a non-transitory computer-readable medium is provided. The computer-readable medium comprises program code for generating a display of a user interface (UI) for a head-mountable display (HMD). The program code, when executed by at least one processor, causes an electronic device to generate three-dimensional content for display by the HMD; identify three-dimensional coordinates for UI elements of the UI that are associated with the three-dimensional content, the three-dimensional coordinates identified within an angular range for the UI that includes a viewable region of a user while wearing the HMD; and in response to a user input, cause the HMD to display the UI elements at the identified three-dimensional coordinates over the three-dimensional content.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer-readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Figure 1:
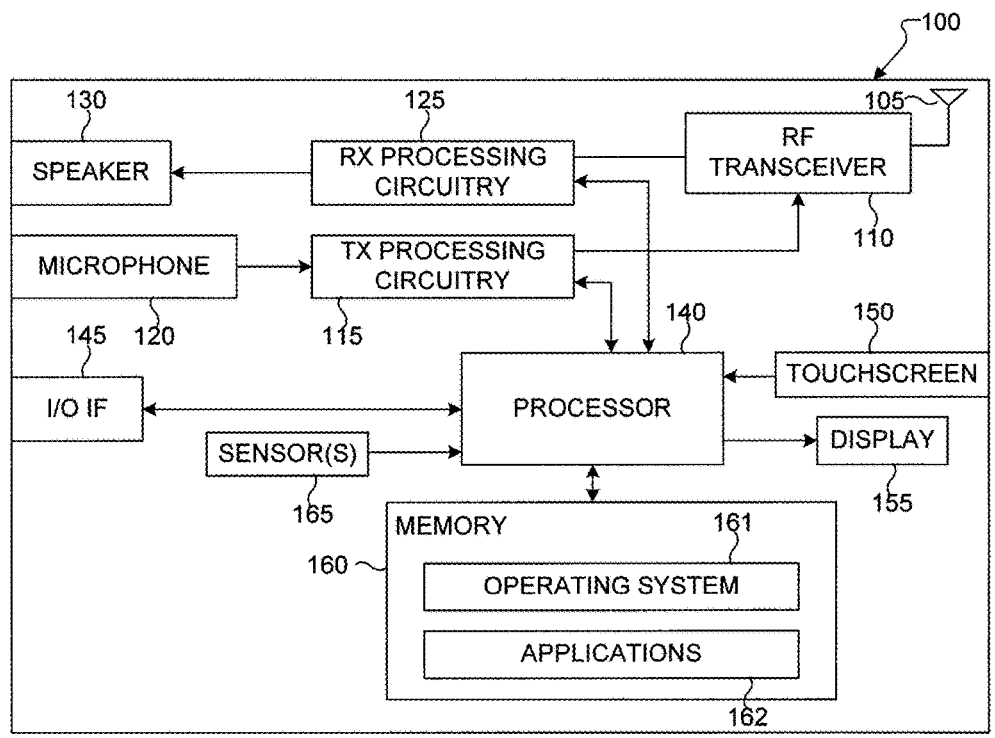
FIG. 1 illustrates an example HMD according to embodiments of the present disclosure and in which embodiments of the present disclosure may be implemented.

FIG. 1 illustrates an example HMD 100 according to embodiments of the present disclosure and in which embodiments of the present disclosure may be implemented. The embodiment of the HMD 100 illustrated in FIG. 1 is for illustration only, the HMD 100 comes in a wide variety of configurations, and FIG. 1 does not limit the scope of this disclosure to any particular implementation of a HMD.

In various embodiments, the HMD 100 may take different forms, and the present disclosure is not limited to any particular form. For example, the HMD 100 may be a mobile communication device, such as, for example, a user equipment, a mobile station, a subscriber station, a wireless terminal, a smart phone, a tablet, etc., that is mountable within a headset for VR and/or AR applications. In other examples, the HMD 100 may include the headset and take the form of a wearable electronic device, such as, for example, glasses, goggles, a helmet, etc., for the VR and/or AR applications.

As shown in FIG. 1, the HMD 100 includes an antenna 105, a radio frequency (RF) transceiver 110, transmit (TX) processing circuitry 115, a microphone 120, and receive (RX) processing circuitry 125. The HMD 100 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The RF transceiver 110 receives, from the antenna 105, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The RF transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data).

The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The RF transceiver 110 receives the outgoing processed baseband or IF signal from the TX processing circuitry 115 and up-converts the baseband or IF signal to an RF signal that is transmitted via the antenna 105.

The processor 140 can include one or more processors or other processing devices and execute the OS 161 stored in the memory 160 in order to control the overall operation of the HMD 100. For example, the processor 140 could control the reception of forward channel signals and the transmission of reverse channel signals by the RF transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the HMD 100 with the ability to connect to other devices, such as laptop computers and handheld computers. The I/O interface 145 is the communication path between these accessories and the processor 140.

The processor 140 is also coupled to the touchscreen 150 and the display 155. The operator of the HMD 100 can use the touchscreen 150 to enter data and/or inputs into the HMD 100. The display 155 may be a liquid crystal display, light-emitting diode (LED) display, optical LED (OLED), active matrix OLED (AMOLED), or other display capable of rendering text and/or graphics, such as from web sites, videos, games, etc.

The memory 160 is coupled to the processor 140. Part of the memory 160 could include a random access memory (RAM), and another part of the memory 160 could include a Flash memory or other read-only memory (ROM).

HMD 100 further includes one or more sensors 165 that can meter a physical quantity or detect an activation state of the HMD 100 and convert metered or detected information into an electrical signal. For example, sensor 165 may include one or more buttons for touch input, e.g., on the headset or the HMD 100, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a bio-physical sensor, a temperature/humidity sensor, an illumination sensor 165K, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, etc. The sensor(s) 165 can further include a control circuit for controlling at least one of the sensors included therein. As will be discussed in greater detail below, one or more of these sensor(s) 165 may be used to control a UI, detect UI inputs, determine the orientation and facing direction of the user for 3D content display identification, etc. Any of these sensor(s) 165 may be located within the HMD 100, within a headset configured to hold the HMD 100, or in both the headset and HMD 100, for example, in embodiments where the HMD 100 includes a headset.

The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

As described in more detail below, the HMD 100 may include circuitry for and applications for providing a 3D UI for a HMD. Although FIG. 1 illustrates one example of HMD 100, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). Also, while FIG. 1 illustrates the HMD 100 configured as a mobile telephone, tablet, or smartphone, the HMD 100 could be configured to operate as other types of mobile or stationary devices.

Embodiments of the present disclosure provide a navigation UI framework for stereoscopic 3D VR or AR applications on the HMD 100. For VR experience using the HMD 100, the user's head motion, i.e., the movement of the HMD 100, is tracked using sensor(s) 165 in the HMD 100 and used to control the display 155. UI elements of the present disclosure include 3D objects that respond to the user's head motions the same way the content display does. For example, the UI elements may include icons in a menu or other types of UI elements for controlling or manipulating the content displayed by the HMD 100. The present disclosure is especially useful for converting applications designed originally for 2D mobile device display into HMD mode.

Figure 2:
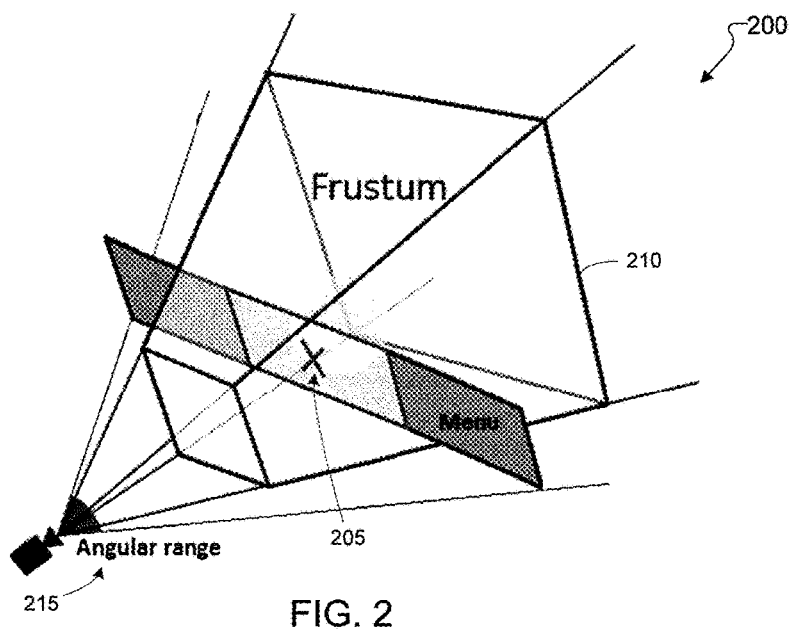
FIG. 2 is a pictorial illustration of a UI menu placement in 3D space in accordance with embodiments of the present disclosure.

FIG. 2 is a pictorial illustration of a UI menu placement in 3D space 200 in accordance with embodiments of the present disclosure. Various embodiments of the present disclosure provide a 3D display of UI elements 205. As illustrated, the HMD 100 assigns UI elements 205 3D coordinates within the 3D space 200 that is viewable by the user of the HMD 100. The HMD 100 places the UI elements 205 within the user's current 3D view frustum 210, i.e., the portion of the total viewable 3D space 200 that is currently viewable by the user as a result of the HMD's 100 current detected orientation and facing direction. UI elements 205 themselves may be 3D objects or 2D objects. The exact 3D coordinates of the UI elements 205 are determined to also take into account factors, such as the coordinates of the current main content displayed in the frustum 210.

Various embodiments of the present disclosure provide UI element display within an angular range 215 that is wider than the user's current 3D view frustum 210. The angular range 215 (e.g., on the x-z plane assuming a Cartesian coordinate system with the x direction generally denoting left/right or yaw, the y direction generally denoting forward/backwards, and the z direction generally denoting up/down or pitch), within which the UI elements 205 are to be placed is configured. In some examples, (e.g., when more UI elements 205 exist than can fit), the HMD 100 displays, either actually or virtually (i.e., not actually displayed on the display 155 but actually displayed when the HMD 100 is moved to a location where the element is virtually displayed), some UI elements 205 outside the current 3D view frustum 210. However, the HMD 100 places these UI elements 205 within the angular range 215 for the UI so that the user would not have to turn the head too much to the left or the right (i.e., yaw or x movement) to see all displayed UI elements 205. Note, while certain examples are given in a Cartesian coordinate system, any suitable coordinate system may be used with any tuple serving as the default coordinate directions.

As discussed above, the HMD 100 detects the user's head motions, i.e., the movement of the HMD 100, using the sensor(s) 165 on the HMD 100 and/or headset, such as, for example, a gyroscope, an accelerometer, etc. The HMD 100 displays the UI elements 205 as well as other elements of the display (e.g., content) to respond to the head motions to simulate looking at and interacting with the real-world view and objects.

The present disclosure describes a framework for navigation UI integrated into an HMD 100. In various embodiments, display of the HMD 100 may be stereoscopic 3D so that the displayed content is assigned 3D coordinates. In binocular HMDs, the displayed image is processed as two images, e.g., left and right display images, each to occupy half of the display screen, and distorted to complement the effects of the lenses (e.g., in the headset) that are placed between the display and the user's eyes for near-eye viewing. The HMD 100 processes the UI disclosed herein as a part of the display image.

The present disclosure also provides user inputs into the UI. For example, the HMD 100 may process different user input modes including, for example, user inputs to select a UI element 205, move the focus, trigger an action, etc., may be determined based on detecting the press of a button, a predetermined motion pattern of the HMD (e.g., a shake or nodding motion), detecting eye focus for a period of time on a particular area of the screen using facial images captured by a camera, etc.

In these embodiments, the HMD 100 sets angular range 215 for the UI in the "horizontal" direction (e.g., on the x-z plane). In some embodiments, this angular range 215 may be configured by the user. The angular range 215 may be wider than the user's field of view of the HMD 100, but could also be narrower or wider depending on purpose. The display of the UI is present inside the angular range 215 so that the user does not have to turn his head too much (e.g., to the left or the right) for a UI interaction.

Upon detecting the initial user input to trigger the UI display, the HMD 100 retrieves actions associated with the currently-displayed content the trigger acted upon, for example, for a navigation menu, the actions might be organized into a list or nested list. The HMD 100 renders each action in the current-level list into graphical UI elements 205, which might be a 3D object. The UI elements 205 are assigned 3D coordinates within the angular range 215 that includes the user's current 3D view frustum 210 and displayed at the assigned coordinates. The exact 3D coordinates of the UI elements 205 also take into account factors, such as the coordinates of the elements of the current main content. For example, depending on what the main content is, the UI might be displayed in the center of the view region on top of the main content, i.e. closer in terms of depth; or at a similar depth to the main content elements but to their top or bottom in terms of y-coordinate to maintain visibility of the main content elements.

In some embodiments, the HMD 100 may adjust the display of the main content to make it easier to perceive the UI elements 205; for example, the main content might be blurred (as if a blurring layer is placed between the content and the UI) or dimmed as the UI elements 205 are displayed. In an embodiment, the UI elements 205 might bump up or down the main content elements to take the place of the main content.

The arrangement of the UI elements 205 can be changed based on implementation. For example, the UI elements 205 may be displayed as a left-aligned, centered, or right-aligned horizontal list or in a special arrangement fitting for the task at hand.

If there are more UI elements 205 to be displayed than the angular range allows, the HMD 100 can incorporate additional selections to allow the additional UI elements 205 to be displayed or allow an array of UI elements 205 to wrap to multiple rows or both, depending on the desired implementation.

Sensor(s) 165 on the HMD 100 detect the changes in the position and orientation of the HMD 100 as the user moves his or her head, turns, or moves around. The HMD 100 processes the sensed and detected changes to adjust the display of the HMD 100 to simulate looking at the real world. As UI elements 205 are 3D objects placed in the same 3D framework as the main content, the HMD 100 adjusts the display of the UI elements 205 in a similar manner.

A UI element 205 may be associated with an action. When an item associated with the action to load another set of UI elements 205 is selected, the display of the new item array replaces the current array in the same 3D location, adjusted according to number of items in the array, etc. In an embodiment, a parent array might move up instead of disappearing when a child array gets displayed in the original position of the parent array. In this case, the user will see the hierarchy of the UI elements 205 he navigated through as with breadcrumb or multi-level dropdown menu.

As discussed in greater detail below, with respect to FIGS. 6A-6D, embodiments of the present disclosure also provide nested arrays display transitions. For example, if a UI element 205 associated with an action to load another set of UI elements 205 and that UI element 205 is selected, the HMD 100 displays the new set of UI elements 205 to replace the current display of UI elements 205. When there exists one or more parent set, display of the current set might include an "up" or "back" button, or the UI may include a breadcrumb to navigate back to the parent array(s). In an embodiment, a parent set might move up instead of disappearing when the child set is displayed. In this example, the user will see the hierarchy of the UI elements 205 navigated through as with a breadcrumb or a multi-level dropdown menu.

Embodiments of the present disclosure provide conversion of mobile device applications for HMD applications. For example, embodiments of the present disclosure may be incorporated into a mobile communication device as a framework for a UI mode switch to a HMD UI mode. In this example, embodiments of the present disclosure provide a program that can be stored on the mobile communication device to convert a UI for an application designed for use with handheld mobile devices and recompose the UI for display and interaction on HMD 100. The HMD version of an application display may simply be a recomposed version of the view as implemented for a handheld mobile device created by the HMD 100 or may be a separate view implemented specifically for a HMD 100 by the application developer, based on the framework provided by the HMD 100.

Figure 3A:
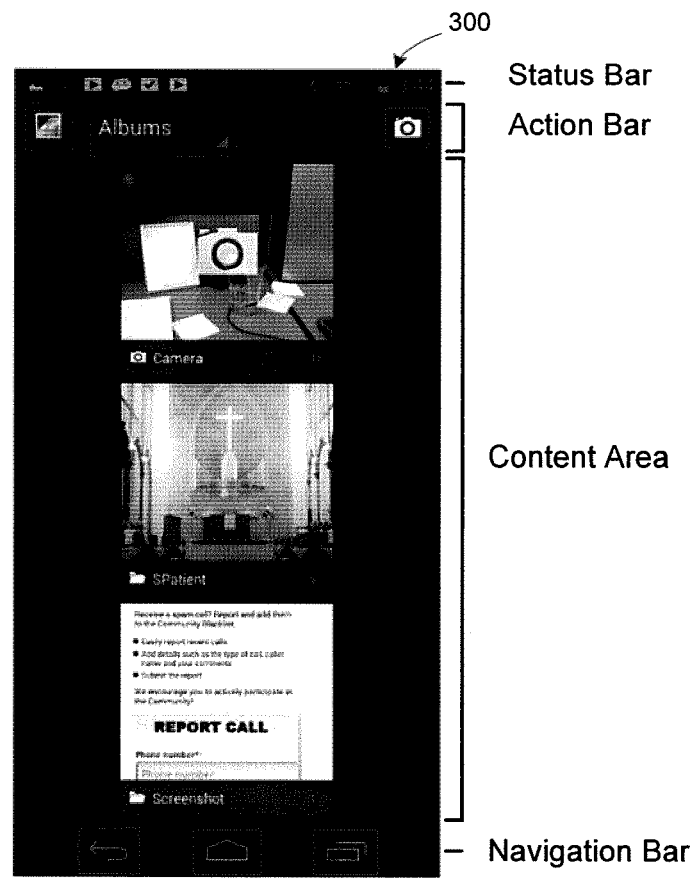
FIGS. 3A-3B illustrate an example of converting a two-dimensional (2D) display for a mobile device into a 3D display for a HMD in accordance with embodiments of the present disclosure.
Figure 3B:
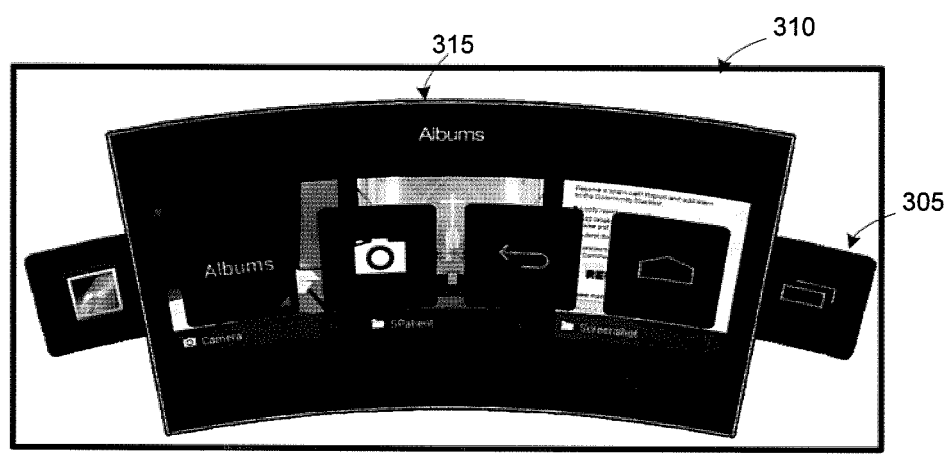

FIGS. 3A-3B illustrate an example of converting a two-dimensional (2D) display for a mobile device into a 3D display for a HMD in accordance with embodiments of the present disclosure. In this illustrative example, a screen 300 for a 2D application for a photo album is illustrated in FIG. 3A. In this example, the navigation bar at the bottom is displayed on the screen 300 when the device is not equipped with equivalent physical buttons.

FIG. 3B illustrates display of corresponding content and UI elements 305 after conversion of the 2D application content and UI into a 3D launch application content for HMD mode. In this example, the HMD 100 converts the application content, action bar UI elements, and navigation bar UI elements for display on the HMD display screen 310. When the menu display is triggered by a user input (e.g., on trackpad or controller button or the like), the HMD generates an array of UI elements 305 representing the items in the applications action bar, the device physical or displayed navigation buttons, etc., and displays the UI elements across the viewable region 315 of the HMD 100. In this example, the first and last items of the array are partially displayed as the viewable region 315 is not wide enough to display all items (e.g., as illustrated, the angular range 215 for the UI is wider than the viewable region 315).

Figure 4A:
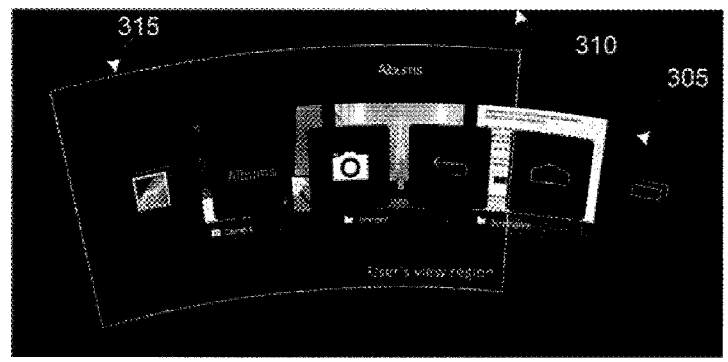
FIGS. 4A-4D illustrate an example of user interaction with UI elements displayed by a HMD in accordance with embodiments of the present disclosure.
Figure 4B:
Figure 4C:
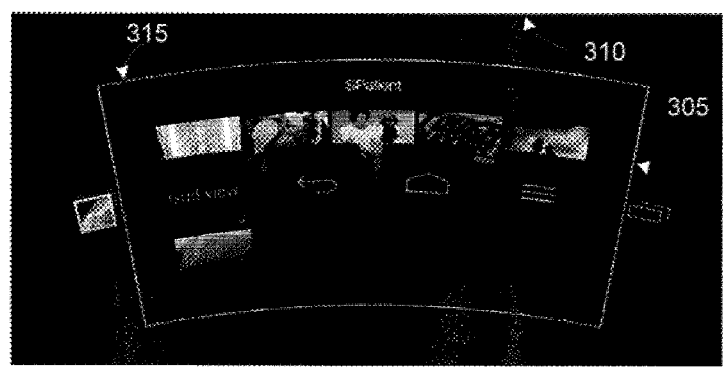
Figure 4D:
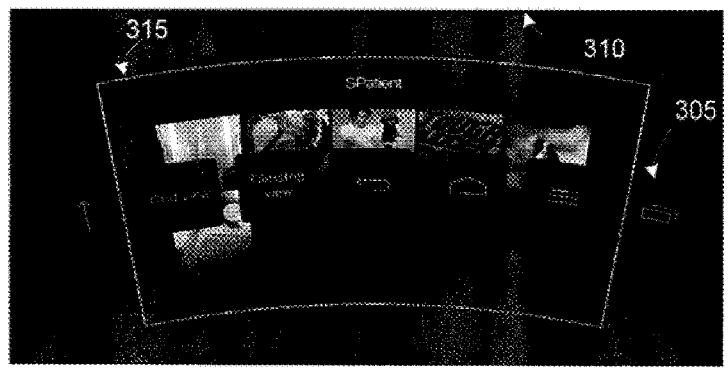

FIGS. 4A-4D illustrate an example of user interaction with UI elements 305 displayed by HMD 100 in accordance with embodiments of the present disclosure. In these illustrative examples, the HMD 100 displays and allows user interaction with the UI elements 305. FIG. 4A illustrates scrolling among displayed UI elements 305. For example, when the user turns his head to the left, the HMD 100 moves the display, including the content and the menu, to the right in response to the sensor(s)' 165 reading of the device orientation and position change. FIG. 4B illustrates a view after the selection of the "SPatient" folder and dismisses the display of the UI elements 305. For example, the HMD 100 may remove the display of the UI elements 305 after a period of time, upon user selection to dismiss the UI, or upon user selection of a UI element 305 that does not have a child UI element, for example, a selection to open a folder as illustrated in FIG. 4B. FIG. 4C illustrates return of the UI menu display including UI options to change the manner in which the UI elements are displayed. FIG. 4D illustrates display of UI elements 305 including hierarchical navigation elements to navigate to a previous menu or folder.

Figure 5A:
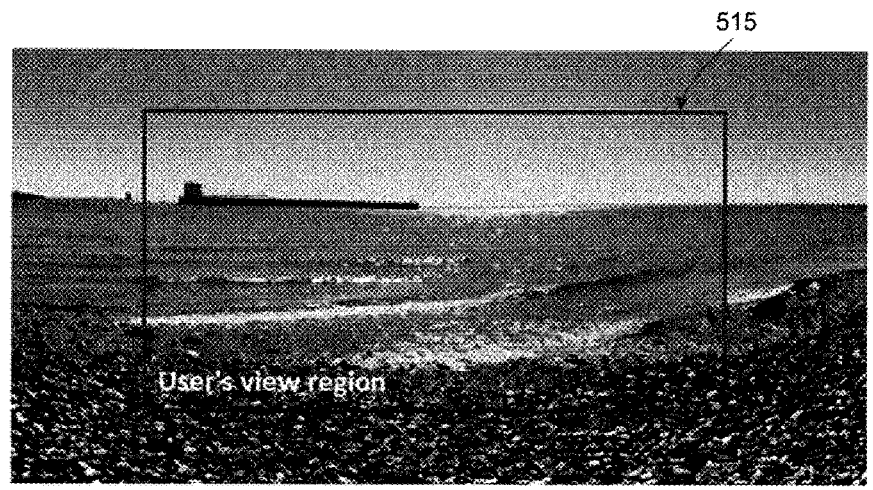
FIGS. 5A-5C illustrate an example of display of UI elements on a HMD within an angular range for the UI in accordance with embodiments of the present disclosure.
Figure 5B:
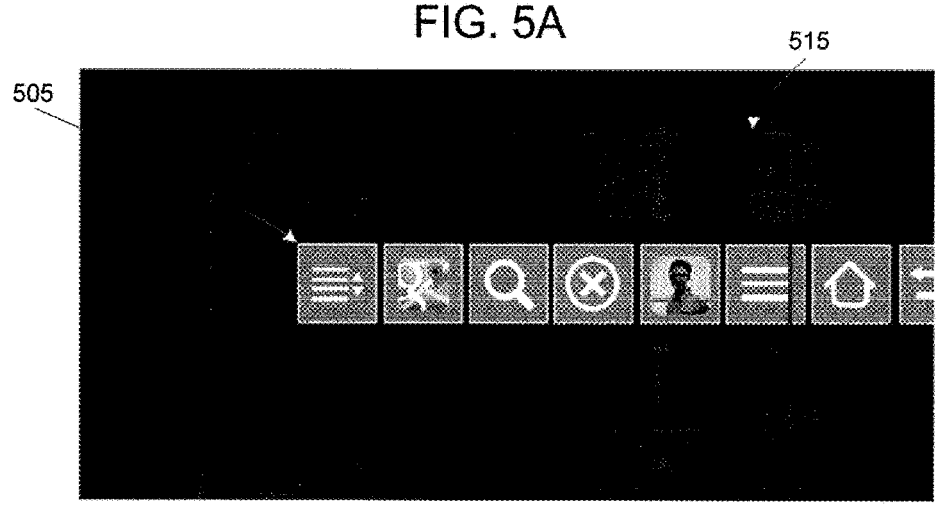
Figure 5C:
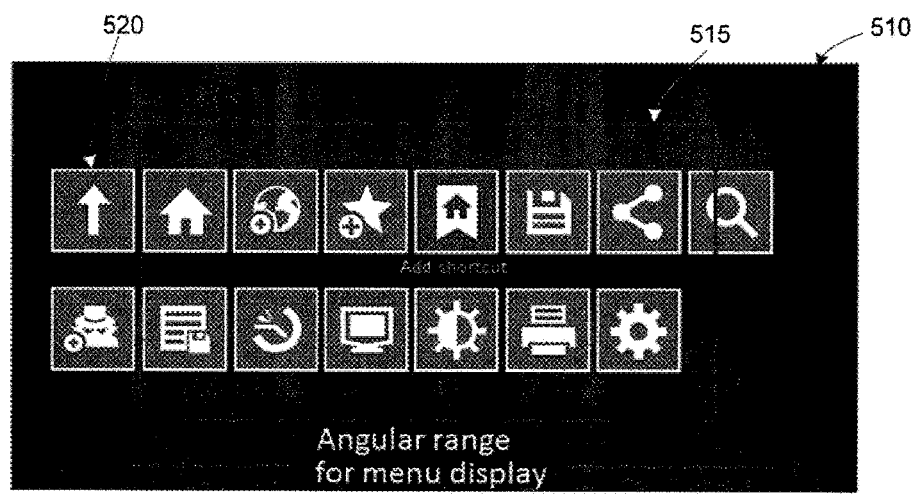

FIGS. 5A-5C illustrate an example of display of UI elements 505 on a HMD 100 within an angular range 510 for the UI in accordance with embodiments of the present disclosure. In these illustrative examples, a portion of a 360° view of an area is displayed by the HMD 100 with a region 515 viewable by the user while wearing the HMD 100 being less than the total view of the area.

As illustrated in FIG. 5A, prior to activation of the UI menu, the HMD displays the main content, in this example, a portion of a 360° view of an area without navigation UI items for a fully immersive experience. Viewable region 515 represents the user's current view region. Since the image is spherical, the user can turn his head and/or body to see different parts of the area at this location using the HMD 100, instead of mouse-clicking/tapping as in a web site viewing mode.

As illustrated in FIG. 5B, when menu display is triggered, the HMD 100 includes UI elements 505, for example, UI items from a webpage associated with the displayed content. Also in this example, the background content is dimmed to focus the attention on the UI. In this example, a user may turn his or her head to the left after the menu of UI elements 505 is displayed to look at the left end of the array.

As illustrated in FIG. 5C, when an option UI element 505 in FIG. 5B is selected, the HMD 100 displays a list of options 520 as UI elements associated with the selected UI element 505 within the angular range 510 for the UI. In this example, because the angular range 510 for menu UI display does not accommodate all the options 520, the list of options 520 is wrapped to two lines.

Figure 6A:
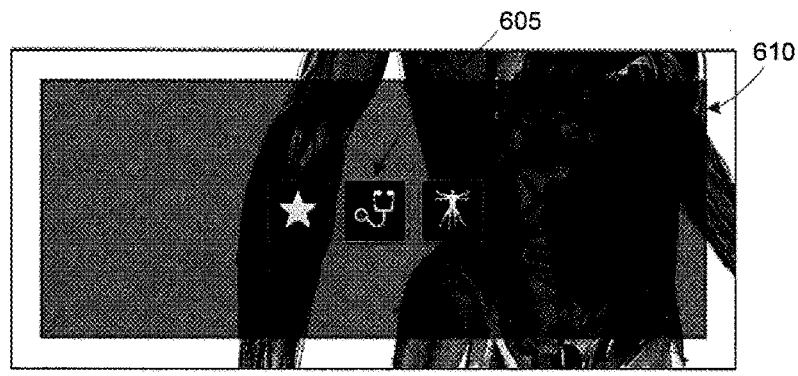
FIGS. 6A-6D illustrate an example of display and user interaction with levels of nested arrays of UI elements on a HMD in accordance with embodiments of the present disclosure.

FIGS. 6A-6D illustrate an example of display and user interaction with levels of nested arrays of UI elements on a HMD 100 in accordance with embodiments of the present disclosure. FIG. 6A illustrates display of UI elements 605 associated with a tools array displayed in a viewable region 610 of the HMD 100. As illustrated in this example, the HMD 100 displays the UI elements 605 in the foreground with the content dimmed in the background.

Figure 6B:
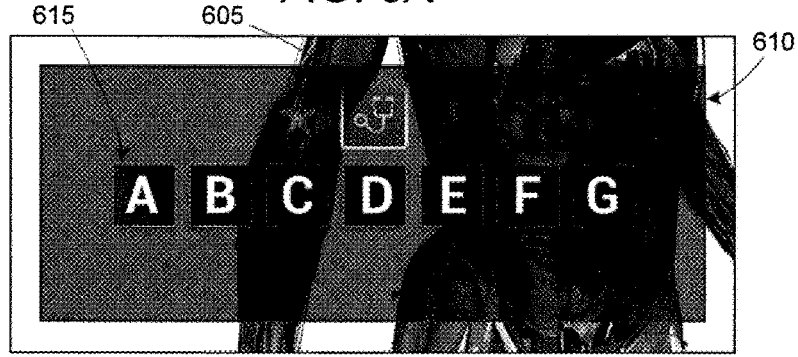
Figure 6C:
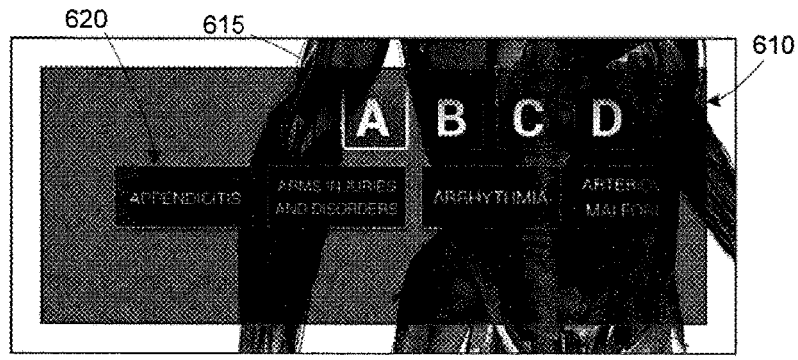

FIG. 6B illustrates display of a child array of UI elements 615 after selection of one of the UI elements 605 in a different level. In this illustrative example, the HMD 100 moves the display of the parent level array of UI elements 605 upwards and displays the child array of UI elements 615 in a center portion of the viewable region 610. FIG. 6C illustrates display of a child array of UI elements 620 after selection of one of the UI elements 615 in a prior level. In this illustrative example, the HMD 100 moves the display of the parent level array of UI elements 615 upwards and displays the child array of UI elements 620 in a center portion of the viewable region 610.

Figure 6D:
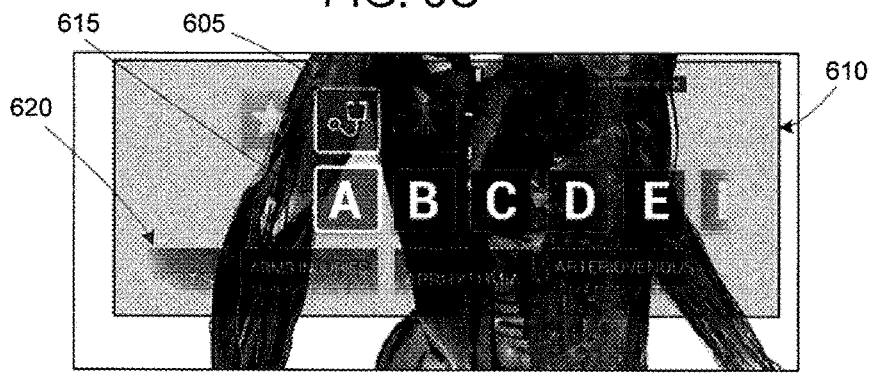

FIG. 6D illustrates display of a parent array of UI elements 615 after an input to navigate back to one of the UI elements 615 in a prior level. In this illustrative example, the HMD 100 moves the display of the child level array of UI elements 620 downwards and displays the parent array of UI elements 615 in a center portion of the viewable region 610. For example, a user may navigate between levels of the multi-level set of arrays using gesture-based controls (e.g., looking up or down). In this manner, the UI framework of the present disclosure allows for display of a trail of the UI hierarchy as well as easy navigation among UI array levels to allow for improved UI interaction in the HMD 100.

In some embodiments, there may be a second mode of control that enables controlling the UI elements separately from the content view. The second control may be used to move the UI elements while keeping the content view that is controlled by the head movement static, so that the user can bring the UI elements moved away from back to his view.

Figure 7:
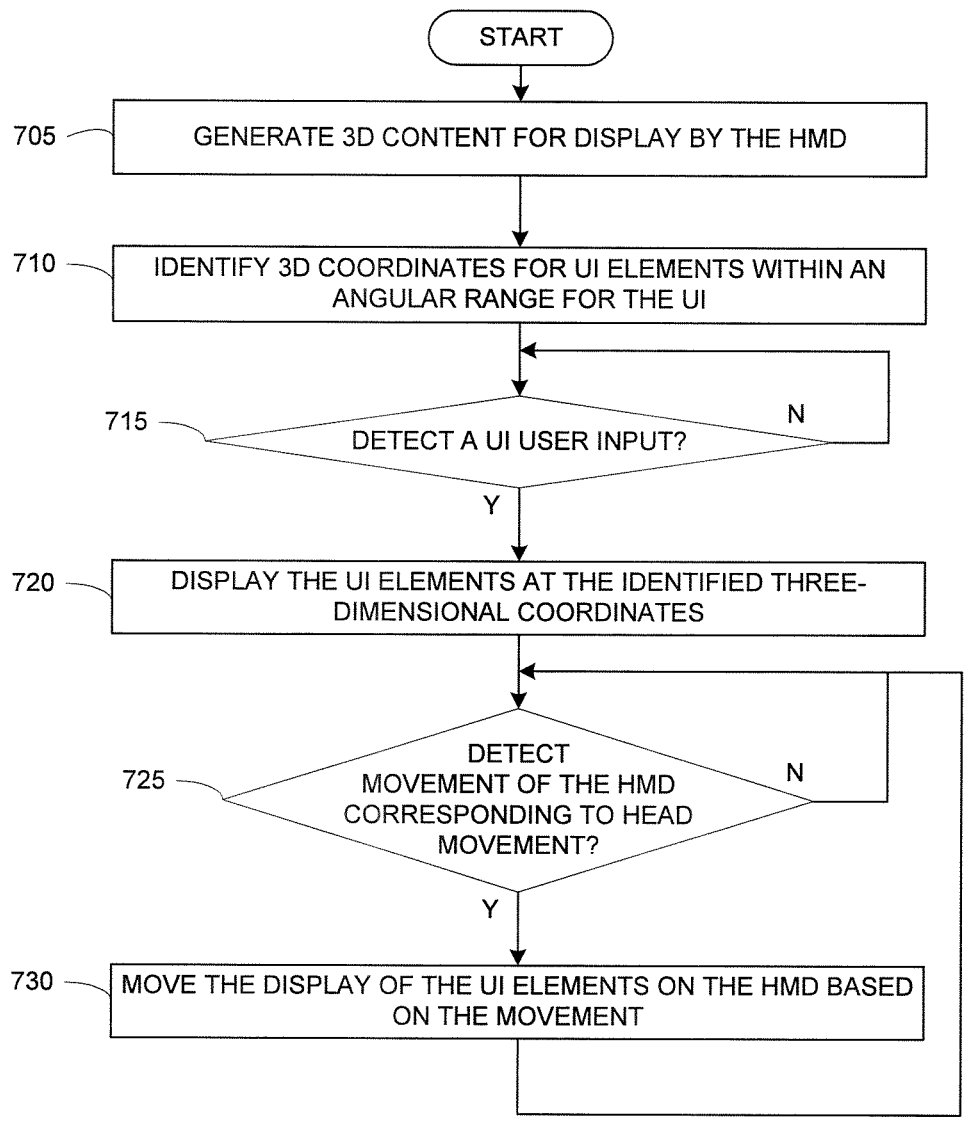
FIG. 7 illustrates a process for displaying a UI for a HMD according to embodiments of the present disclosure.

FIG. 7 illustrates a process for displaying a UI for a HMD according to embodiments of the present disclosure. For example, the process depicted in FIG. 7 may be performed by the HMD 100 in FIG. 1.

The process begins with the HMD 100 generating 3D content for display by the HMD (step 705). For example, in step 705, the HMD 100 may be a display for a mobile communication device, such as, for example, a smart phone or tablet, that is mountable in a headset, such as, for example, a Gear VR® headset, to provide a head-mounted display experience. In other examples, the HMD 100 may itself be both a headset and display for both VR and AR applications. In one or more embodiments, the viewable region of the user while wearing the HMD may be smaller than the display of the HMD 100, for example, when the HMD 100 is on the mobile communication device. In step 705, the generating of the 3D content for display may include converting 2D content displayable by the display for the mobile communication device into the three-dimensional content for display on the HMD in the viewable region. This conversion may occur in response to a user input to switch from a regular 2D mode of content display to a 3D HMD mode of content display or automatically, for example, upon the HMD 100 detecting placement of the HMD 100 inside a headset. This conversion to 3D may involve splitting the display of the HMD into left and right images for stereoscopic combination of the images via, for example, optics included in the headset.

The HMD 100 identifies 3D coordinates for UI elements within an angular range for the UI (step 710). For example, in step 710, the HMD 100 may normally display just 3D content to provide an immersive 3D experience. However, to control and manipulate the HMD 100, the HMD 100 provides a UI within an angular range of the 3D displayable area of the HMD 100. For example, the angular range may be a plane (e.g., the x/z plane in 3D space) within the 3D viewable area displayable by the HMD 100 that includes the region viewable by the user while wearing the HMD 100. In some embodiments, the angular range for the UI is wider than the region viewable by the user while wearing the HMD 100, for example, to allow for additional UI elements to be actually or virtually displayed by the HMD 100 but not immediately visible to the user while wearing the HMD 100, for example, to allow for scrolling among UI elements.

The HMD 100 then monitors for a UI user input (step 715). For example, in step 715, the HMD 100 may monitor for the press of a button or a motion pattern of the HMD (e.g., a shake or nodding motion) associated with initiation of display of the UI, by detecting eye focus for a period of time on a particular area of the screen associated with initiation of display of the UI using facial images of the user associated with initiation of display, etc.

If the HMD 100 detects the UI user input at step 715, the HMD 100 then displays the UI elements at the identified three-dimensional coordinates (step 720). For example, in step 720, the HMD 100 displays the UI elements (e.g., menu items) over the three-dimensional content, which may include blurring the background 3D content. In some embodiments, the UI elements themselves may also be three dimensional, thus the assigned three-dimensional coordinates may include a range of "y" coordinate values within the 3D space displayable by the HMD 100. In other examples, the UI elements may be inlaid with the 3D content, for example, some or all of the displayed 3D content may be in the foreground and/or in the background with respect to the displayed location of the UI elements. In step 720, the HMD 100 displays the UI elements within the angular range of the UI.

As discussed herein, the angular range of the UI may be slightly wider than the viewable region of the user wearing the HMD 100, thus allowing for display of additional UI elements or parts of the displayed UI elements outside of the current field of view of the user, which can be scrolled to based on, for example, user head movements. The slightly wider width of the angular range of the UI allows for quick access to all of the displayed UI elements by the user. Additionally, in various embodiments, the angular range for the UI is based on the viewing location of the user on the display of the HMD 100 when the UI is initially triggered. For example, slight movements of the HMD 100 may allow for display of/scrolling among the UI elements within the angular range, while larger movements may allow for display of content that is outside of the angular range for the UI. Thus, the user may be able to "out-scroll" or "out-maneuver" the displayed UI elements to view content above/below or to the left/right and later return to the angular range of the UI to again view and interact with the displayed UI elements. Additionally, each time the UI is triggered, the location of the angular range for the UI within the 360° 3D space may be based on the viewing location of the HMD 100 at the triggering of the UI. As such, step 710 may be performed each time the UI is initiated or may be performed once with absolute 3D coordinates that are adapted based on the relative display location at the time the UI is initiated.

Thereafter, the HMD 100 monitors for movement of the HMD corresponding to head movement (step 725). For example, in step 725, the HMD 100 may detect the HMD 100 moving using one or more sensors (e.g., gyroscope, accelerometer, magnetometer, etc.) (e.g., to the left or right, diagonally, up or down, forward or backwards, any combination of the above, etc.), which correspond to a user moving his or her head while wearing the HMD 100.

If the HMD 100 detects movement of the HMD corresponding to head movement in step 725, the HMD 100 then moves the display of the UI elements on the HMD based on the movement (step 730). For example, in step 730, the HMD 100 may move the UI elements in a direction corresponding to (e.g., opposite direction of) a movement direction of the HMD to provide the effect that the location of the UI elements in 3D space remains constant and the user is simply looking in a different direction, when in fact, the HMD 100 is moving the location of items displayed on the display to provide a VR/AR effect.

In one example, the HMD 100 may move UI elements to scroll among UI elements in the angular range of the UI, for example, to display UI elements that may not have been previously visible (e.g., outside of the prior field of vision of the user while wearing the HMD 100, such as, for example, to the left or the right, above or below, etc.)

In another example, the HMD 100 may move UI elements to display additional levels of nested arrays of UI elements. For example, the presently displayed UI elements may be one level of a multi-level set of nested arrays of UI elements. By sensing a user moving his or her head (e.g., up or down), the HMD 100 may move to a display of a parent or child array in the multi-level set of nested arrays of UI elements based on the direction of the sensed movement. In one embodiment, the HMD 100 may display the parent or child array of UI elements in the location of the previously-displayed array of UI elements and move the display of the previously-displayed array of UI elements to another location (e.g., up or down) to illustrate scrolling among levels of nested arrays in the multi-level set of nested arrays. In some embodiments, the HMD 100 may illustrate the scrolling among levels of nested arrays in the multi-level set of nested arrays in response to a user selection of one UI element in a displayed array, e.g., may display a child array associated with the selected UI element. The HMD 100 may detect the user selection in any type of manner, for example, without limitation, based on a predefined movement pattern, a button selection, by detecting eye focus on a particular UI element for a period of time using facial images of the user, etc.

The HMD 100 continues to process movements in displaying the UI as discussed above, until, for example, an input is detected to end the display of the UI after which the UI display is ended. For example, this input may be the same as or similar to the UI user input discussed above with respect to step 715 or may be automatic based on, for example, time.

Although FIG. 7 illustrates an example process for displaying a UI for a HMD, various changes could be made to FIG. 7. For example, while shown as a series of steps, various steps in each figure could overlap, occur in parallel, occur in a different order, or occur multiple times.

Embodiments of the present disclosure provide a framework for HMD UI design and for converting a UI of mobile device application for use on an HMD with stereoscopic 3D display. Embodiments of the present disclosure allow for application designs for 2D mobile device screen to be decomposed into elements, such as action bar items, main content, navigation bar items, etc., and recomposed for a 3D HMD environment.

Embodiments of the present disclosure provide stereoscopic 3D display to emulate depth but may similarly be applied in a 2D display. Embodiments of the present disclosure enable not only depth of displayed content but also interaction with UI elements. For example, the user might "walk through" the UI elements, or different levels of nested arrays might be displayed at different depths.

Embodiments of the present disclosure also mirror the movement of the UI elements to the user's movements so that the UI movements feel natural, instead of being accelerated or otherwise exaggerated or interpolated. As the view of a HMD is immersive, unpleasant effects of unnatural movements of display elements are amplified in a HMD, and natural interaction is provided. The menu display may not be fixed in relation to the user position or the device, but may be fully integrated into and move with the 3D scene.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for displaying a user interface (UI) for a head-mountable display (HMD), the method comprising:
   generating three-dimensional content for display by the HMD;
   identifying three-dimensional coordinates for an array of UI elements of the UI that are associated with the three-dimensional content, the three-dimensional coordinates identified within an angular range for the UI that includes a viewable frustum region of the HMD, wherein generating the three-dimensional content for display by the HMD comprises converting two-dimensional UI content displayable by a display of a mobile communication device into the three-dimensional content for display by the HMD in at least the viewable frustum region, wherein the array of UI elements comprises two-dimensional UI elements that are one of: menu items or interface elements configured to control or manipulate the three-dimensional content; and
   in response to receiving an input, displaying the array of UI elements at the identified three-dimensional coordinates as three-dimensional objects in front of the three-dimensional content; and
   in response to detecting movement of the HMD corresponding to a head movement, adjusting the array of UI elements and moving the display of the array of UI elements on the HMD in a direction corresponding to a direction of the head movement of the HMD such that the display of the array of UI elements provides a 3D visual effect wherein a location of the array of UI elements, displayed as three-dimensional objects in front of the three-dimensional content, remain constant with respect to the displayed three-dimensional content as the displayed three-dimensional content moves in accordance with the head movement.

2. The method of claim 1, wherein the angular range for the UI is a plane that is wider than the viewable frustum region of the HMD, wherein a portion of the angular range is within the viewable frustum region of the HMD and a portion of the angular range is outside the viewable frustum region of the HMD; and wherein one or more UI elements of the array of UI elements are displayed on the HMD outside of the viewable frustum region of the HMD such that the one or more UI elements displayed outside the viewable frustum region of the HMD can be viewed when a yaw movement of the HMD is sensed by a movement sensor in the HMD.

3. The method of claim 1, wherein the displayed array of UI elements are a first array of UI elements corresponding to a first level in a nested set of arrays, the method further comprising displaying a second array of UI elements corresponding to a second level in the nested set of arrays in response to detecting an input corresponding to the second level.

4. The method of claim 3, wherein:

the first array of UI elements is a parent array of UI elements and the second array of UI elements is a child array of UI elements, and displaying the second array of UI elements comprises displaying the child array of UI elements in a location on the HMD where the parent array of UI elements was displayed and moving the display of the parent array of UI elements to another location on the HMD in response to detecting the input corresponding to the second level.

5. The method of claim 1, wherein:

the HMD is a display for a mobile communication device, the viewable frustum region of the HMD is smaller than the display for the mobile communication device, and generating the three-dimensional content for display by the HMD comprises converting two-dimensional content displayable by the display for the mobile communication device into the three-dimensional content for display on the HMD in the viewable frustum region of the HMD.

6. An apparatus for displaying a user interface (UI), the apparatus comprising:

a head-mountable display (HMD); and at least one processor configured to:

generate three-dimensional content for display by the HMD;

identify three-dimensional coordinates for an array of UI elements of the UI that are associated with the three-dimensional content, the three-dimensional coordinates identified within an angular range for the UI that includes a viewable frustum region of the HMD, wherein when the at least one processor generates the three-dimensional content, the at least one processor is further configured to convert two-dimensional UI content displayable by a display of a mobile communication device into the three-dimensional content for display by the HMD in at least the viewable frustum region, and wherein the array of UI elements comprises two-dimensional UI elements that are one of: menu items or interface elements configured to control or manipulate the three-dimensional content;

in response to receipt of an input, cause the HMD to display the array of UI elements at the identified three-dimensional coordinates as three-dimensional objects in front of the three-dimensional content; and in response to movement detection of the HMD that corresponds to a head movement, adjust and move the display of the array of UI elements on the HMD in a direction corresponding to a direction of the head movement of the HMD such that the display of the array of UI elements provides a 3D visual effect wherein a location of the array of UI elements, displayed as three-dimensional objects in front of the three-dimensional content, remain constant with respect to the displayed three-dimensional content as the displayed three-dimensional content moves in accordance with the head movement.

7. The apparatus of claim 6, wherein the angular range for the UI is a plane that is wider than the viewable frustum region of the HMD, wherein a portion of the angular range is within the viewable frustum region of the HMD and a portion of the angular range is outside the viewable frustum region of the HMD; and wherein one or more UI elements of the array of UI elements are displayed on the HMD outside of the viewable frustum region of the HMD such that the one or more UI elements displayed outside the viewable frustum region of the HMD can be viewed when a yaw movement of the HMD is sensed by a movement sensor in the HMD.

8. The apparatus of claim 6, wherein:

the displayed array of UI elements are a first array of UI elements corresponding to a first level in a nested set of arrays, and the at least one processor is further configured to cause the HMD to display a second array of UI elements corresponding to a second level in the nested set of arrays in response to detecting an input corresponding to the second level.

9. The apparatus of claim 8, wherein:

the first array of UI elements is a parent array of UI elements and the second array of UI elements is a child array of UI elements, and the at least one processor is configured to cause the HMD to display the child array of UI elements in a location on the HMD where the parent array of UI elements was displayed and move the display of the parent array of UI elements to another location on the HMD in response to detecting the input corresponding to the second level.

10. The apparatus of claim 6, wherein:

the HMD is a display for a mobile communication device, the viewable frustum region of the HMD is smaller than the display for the mobile communication device, and the at least one processor is configured to convert two dimensional content displayable by the display for the mobile communication device into the three-dimensional content for display on the HMD in the viewable frustum region of the HMD.

11. A non-transitory computer-readable medium comprising program code for generating a display of a user interface (UI) for a head-mountable display (HMD) that, when executed by at least one processor, causes an electronic device to:

generate three-dimensional content for display by the HMD;

identify three-dimensional coordinates for an array of UI elements of the UI that are associated with the three-dimensional content, the three-dimensional coordinates identified within an angular range for the UI that includes a viewable frustum region of the HMD, wherein when the electronic device is caused to generate the three-dimensional content for display by the HMD, the non-transitory computer-readable medium further comprises program code that, when executed by the at least one processor, causes the electronic device to convert two-dimensional UI content displayable by a display of a mobile communication device into the three-dimensional content for display by the HMD in at least the viewable frustum region, and wherein the array of UI elements comprises two-dimensional UI elements that are one of: menu items or interface elements configured to control or manipulate the three-dimensional content; and in response to receipt of an input, cause the HMD to display the array of UI elements at the identified three-dimensional coordinates as three-dimensional objects in front of the three-dimensional content; and in response to detecting movement of the HMD corresponding to a head movement, adjust and move the display of the array of UI elements on the HMD in a direction corresponding to a direction of the head movement of the HMD such that the display of the array of UI elements provides a 3D visual effect wherein a location of the array of UI elements, displayed as three-dimensional objects in front of the three-dimensional content, remain constant with respect to the displayed three-dimensional content as the three-dimensional content moves in accordance with the head movement.

12. The non-transitory computer-readable medium of claim 11, wherein the angular range for the UI is a plane that is wider than the viewable frustum region of the HMD, wherein a portion of the angular range is within the viewable frustum region of the HMD and a portion of the angular range is outside the viewable frustum region of the HMD; and wherein one or more UI elements of the array of UI elements are displayed on the HMD outside of the viewable frustum region of the HMD such that one or more of the UI elements displayed outside the viewable frustum region of the HMD can be viewed when a yaw movement of the HMD is sensed by a movement sensor in the HMD.

13. The non-transitory computer-readable medium of claim 11, wherein:

the displayed array of UI elements are a first array of UI elements corresponding to a first level in a nested set of arrays, and the computer-readable medium further comprises program code that that, when executed by the at least one processor, causes the HMD to display a second array of UI elements corresponding to a second level in the nested set of arrays in response to detection of an input corresponding to the second level.

14. The non-transitory computer-readable medium of claim 13, wherein:

the first array of UI elements is a parent array of UI elements and the second array of UI elements is a child array of UI elements, and the program code that, when executed by the at least one processor, causes the HMD to display the child array of UI elements in a location on the HMD where the parent array of UI elements was displayed and move the display of the parent array of UI elements to another location on the HMD in response to the detection of the input corresponding to the second level.

15. The method of claim 1, wherein one or more UI elements of the array of UI elements are generated outside the viewable frustum region of the HMD, further comprising:

in response to detecting a movement of the HMD, relocating the array of UI elements such that the one or more of the UI elements generated outside the viewable frustum region of the HMD are displayed in the viewable frustum region of the HMD.

* * * * *